(12) United States Patent
Kim et al.

(10) Patent No.: US 8,750,193 B2
(45) Date of Patent: Jun. 10, 2014

(54) APPARATUS AND METHOD FOR TRANSMITTING AND RECEIVING MBS DATA

(75) Inventors: Eunkyung Kim, Seoul (KR); Soojung Jung, Daejeon (KR); Jae Sun Cha, Daejeon (KR); Sung Cheol Chang, Daejeon (KR); Hyun Lee, Daejeon (KR); Chul Sik Yoon, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 319 days.

(21) Appl. No.: 13/170,339

(22) Filed: Jun. 28, 2011

(65) Prior Publication Data

US 2012/0002582 A1    Jan. 5, 2012

(30) Foreign Application Priority Data

Jun. 28, 2010 (KR) .................. 10-2010-0061347
Jul. 8, 2010 (KR) .................. 10-2010-0065731
Jun. 28, 2011 (KR) .................. 10-2011-0062843

(51) Int. Cl.
*H04H 20/71* (2008.01)
(52) U.S. Cl.
USPC ........................................ 370/312; 709/231

(58) Field of Classification Search
USPC ............................................ 370/312; 709/231
See application file for complete search history.

(56) References Cited

U.S. PATENT DOCUMENTS

| | | | |
|---|---|---|---|
| 7,720,072 B2 * | 5/2010 | Tan et al. ................. | 370/395.21 |
| 8,218,480 B2 * | 7/2012 | Lee et al. ...................... | 370/328 |
| 2009/0240998 A1 * | 9/2009 | Nikkila et al. ................. | 714/746 |
| 2010/0177676 A1 * | 7/2010 | Wang et al. .................... | 370/312 |

OTHER PUBLICATIONS

"DRAFT Amendment to IEEE Standard for Local and metropolitan area networks, Part 16: Air Interface for Fixed and Mobile Broadband Wireless Access Systems", IEEE P802.16m/D6 May 2010 (932pgs).

* cited by examiner

*Primary Examiner* — Wei Zhao
(74) *Attorney, Agent, or Firm* — NSIP Law (57) ABSTRACT

An MBS transmitting apparatus allocates a plurality of subbands of an MBS transmission carrier to an MBS region and a non-MBS region and generates region allocation information of the MBS region and the non-MBS region. The MBS transmitting apparatus allocates the subbands, allocated to the MBS region, to at least one MBS zone and generates MBS zone allocation information of the at least one MBS zone. The MBS transmitting apparatus transmits the region allocation information and the MBS zone allocation information and transmits MBS data through the subbands allocated to the MBS region.

19 Claims, 8 Drawing Sheets

APPARATUS AND METHOD FOR TRANSMITTING AND RECEIVING MBS DATA

CROSS-REFERENCE TO RELATED APPLICATION

This application claims priority to and the benefit of Korean Patent Application No. 10-2010-0061347 filed in the Korean Intellectual Property Office on Jun. 28, 2010, 10-2010-0065731 filed in the Korean Intellectual Property Office on Jul. 8, 2010 and 10-2011-0062843 filed in the Korean Intellectual Property Office on Jun. 28, 2011, the entire contents of which are incorporated herein by reference.

BACKGROUND OF THE INVENTION (a) Field of the Invention

The present invention relates to a base station, a relay station, and a mobile station. More particularly, the present invention relates to a method and apparatus for sending and receiving Multicast Broadcast Service (MBS) data.

(b) Description of the Related Art

In a mobile communication system using a multi-carrier, data transmitted through one carrier supporting MBS may be divided into a plurality of subbands on the frequency axis. All subbands may be allocated to an MBS region. Furthermore, those subbands may be allocated an MBS region and a non-MBS region for providing service other than MBS, such as unicast service. Each region is allocated at least one subband.

Meanwhile, the MBS region may be divided into multiple MBS zones. Each MBS zone is allocated at least one subband.

Accordingly, an MBS transmitting apparatus, such as a base station or a relay station, is required to send information to an MBS receiving apparatus, such as a mobile station, so that the MBS receiving apparatus can recognize an MBS region and identify each MBS zone based on the information.

Therefore, a method in which an MBS transmitting apparatus provides allocation information for a zone and a zone flag regarding whether the last zone is allocated to a non-MBS region to an MBS receiving apparatus may be used.

According to this method, in a network including a zone #1, a zone #2, and a zone #3, the zone #1 and the zone #2 are allocated to an MBS region, and the zone #3 is allocated to a non-MBS region or an MBS region.

Accordingly, the MBS receiving apparatus served by the MBS transmitting apparatus belonging to the zone #1 and the zone #2 can recognize that the zone #1 and the zone #2 have been allocated to the MBS region based on zone allocation information and can recognize that the zone #3 has been allocated to the non-MBS region based on the zone flag.

However, the MBS receiving apparatus served by the MBS transmitting apparatus belonging to only the zone #1 cannot recognize whether the zone #2 has been allocated to the non-MBS region. Accordingly, the MBS transmitting apparatus belonging to only the zone #1 cannot allocate the zone #2 to the non-MBS region. Furthermore, the MBS receiving apparatus served by the MBS transmitting apparatus belonging to only the zone #2 cannot recognize whether the zone #1 has been allocated to the non-MBS region. Accordingly, the MBS transmitting apparatus belonging to only the zone #2 cannot allocate the zone #1 to the non-MBS region. Accordingly, waste of the bandwidth may not be avoided.

Meanwhile, Multi-Input Multi-Output (MIMO) technology may be classified into a Closed-Loop (CL) MIMO method and an Open-Loop (OL) MIMO method.

The CL MIMO method is technology that may use various channel information included in feedback information received from an MBS receiving apparatus when an MBS transmitting apparatus transmits data to the MBS receiving apparatus. According to the CL MIMO method, an MBS receiving apparatus estimates channel information for each channel through a plurality of antennas and transmits feedback information, including the various estimated channel information, to an MBS transmitting apparatus. The MBS transmitting apparatus applies the received feedback information to transmission data so that more accurate MIMO technical effects can be obtained. Accordingly, reliable and high-speed data transmission effects can be obtained.

The OL MIMO method is a method of transmitting data without using channel information included in feedback information received from an MBS receiving apparatus. The feedback information may not be sent in the OL MIMO method. Furthermore, although the feedback information is transmitted, an MBS transmitting apparatus may not use channel information included in a feedback message.

In general, in a communication system, the OL method may be applied to a channel environment for an MBS receiving apparatus that moves at high speed, and the CL method may be applied to a channel environment to an MBS receiving apparatus that moves at low speed. The OL method is applied to an MBS receiving apparatus moving at high speed because channels for the MBS receiving apparatus have a severe change and thus channel information included in feedback information is difficult to be reliable. On the other hand, the CL method can be applied to an MBS receiving apparatus moving at low speed because a channel environment for the MBS receiving apparatus has a relatively less change, various pieces of channel information included in feedback information is reliable, and communication apparatuses are less sensitive to delay.

Some subbands of a non-MBS region may be allocated to a region for MIMO. Accordingly, an MBS receiving apparatus needs to check a subband-based MIMO region for MIMO.

According to the method using zone allocation information and a zone flag, however, the MBS transmitting apparatus belonging to only the zone #1 cannot allocate subbands, belonging to the zone #2, to the MIMO region because it cannot allocate the zone #2 to the non-MBS region. Furthermore, the MBS transmitting apparatus belonging to only the zone #2 cannot allocate any subband, belonging to the zone #1, to a region for MIMO because it cannot allocate the zone #1 to a non-MBS region.

SUMMARY OF THE INVENTION

An aspect of the present invention provides a zone allocation information providing method capable of reducing waste of the bandwidth.

Furthermore, another aspect of the present invention provides a method in which an MBS transmitting apparatus can clearly transmit information of a MIMO region to an MBS receiving apparatus although multiple zones are allocated to a non-MBS.

According to an embodiment of the present invention, a method of transmitting MBS data in an MBS transmitting apparatus is provided. The method includes allocating subbands of an MBS transmission carrier to an MBS region and a non-MBS region; generating region allocation information of the MBS region and the non-MBS region; allocating subbands, allocated to the MBS region, to at least MBS zone; generating MBS zone allocation information of the at least MBS zone; transmitting the region allocation information and the MBS zone allocation information; and transmitting the MBS data through the subbands allocated to the MBS region, wherein the region allocation information indicates whether each subband is allocated to the MBS region or allocated to the non-MBS region.

The region allocation information may include a first bitmap including bits corresponding to the subbands. Each bit of the first bitmap may indicate whether a corresponding subband is allocated either to the MBS region or to the non-MBS region.

The MBS zone allocation information may include a second bitmap including bits corresponding to remaining subbands other than the first subband among the subbands allocated to the MBS region. Each bit of the second bitmap may indicate whether a corresponding subband is allocated to the same MBS region as that allocated by the previous subband.

The MBS transmission carrier may correspond to a mixed carrier for MBS and non-MBS. The method may further include transmitting non-MBS data through subbands allocated to the non-MBS region.

The method may further include allocating all or some of the subbands, allocated to the non-MBS region, to a MIMO region for MIMO; generating MIMO region allocation information of the MIMO region; and transmitting the MIMO region allocation information to an MBS receiving apparatus.

The region allocation information may be broadcast through a system information message, the MBS zone allocation information may be broadcast through an MBS-specific message, and the MIMO region allocation information may be broadcast through the system information message.

The MIMO region allocation information may include information of the number of the subbands allocated to the MIMO region. Subbands not allocated to the MBS region, among those subbands corresponding to the number from the first subband, may correspond to the MIMO region.

The MIMO region allocation information may include a third bitmap including bits corresponding to subbands allocated to the non-MBS region. Each bit of the third bitmap may indicate whether a corresponding subband is allocated to the MIMO region.

The MIMO region allocation information may include information of the number of the subbands allocated to the MIMO region. Subbands corresponding to the number from the first subband, among the subbands allocated to the non-MBS region, may correspond to the MIMO region.

The MIMO region allocation information may include a third bitmap including bits. Those bits of the third bitmap may correspond to subbands corresponding to the number of bits of the third bitmap from the first subband, among the subbands that are allocated to the MBS region by a network. Each bit of the third bitmap may indicate whether a corresponding subband is allocated to the MIMO region.

The MBS transmission carrier may correspond to an MBS dedicated carrier, and the non-MBS region may correspond to an unused region.

The region allocation information may be broadcast through a system information message, and the MBS zone allocation information may be broadcast through an MBS-specific message.

An MBS transmitting apparatus according to another embodiment of the present invention includes a region allocator configured to allocate subbands of an MBS transmission carrier to an MBS region and a non-MBS region; a region allocation information generator configured to generate region allocation information of the MBS region and the non-MBS region; an MBS zone allocator configured to allocate the subbands, allocated to the MBS region, to at least one MBS zone; an MBS zone allocation information generator configured to generate MBS zone allocation information of the at least one MBS zone; a control data transmitter configured to transmit the region allocation information and the MBS zone allocation information; and an MBS data transmitter configured to transmit MBS data through the subbands allocated to the MBS region, wherein the region allocation information indicates whether each subband is allocated either to the MBS region or to the non-MBS region.

The region allocation information may include a first bitmap including bits corresponding to subbands, and each bit of the first bitmap may indicate whether a corresponding subband is allocated either to the MBS region or to the non-MBS region. The MBS zone allocation information may include a second bitmap including bits corresponding to remaining subbands other than the first subband from among the subbands allocated to the MBS region, and each bit of the second bitmap may indicate whether a corresponding subband is allocated to the same MBS region as that allocated by the previous subband.

The MBS transmission carrier may correspond to a mixed carrier for MBS and non-MBS. The MBS transmitting apparatus may further include a non-MBS data transmitter configured to transmit non-MBS data through subbands allocated to the non-MBS region; a MIMO region allocator configured to allocate all or some of the subbands, allocated to the non-MBS region, to a MIMO region for multi-input multi-output (MIMO); and a MIMO region allocation information generator configured to generate MIMO region allocation information for the MIMO region. The control data transmitter may transmit the MIMO region allocation information to an MBS receiving apparatus.

According to yet another embodiment of the present invention, a method of an MBS receiving apparatus receiving MBS data in an MBS receiving apparatus is provided. The method includes receiving region allocation information of an MBS region and a non-MBS region; allocating subbands of an MBS transmission carrier to the MBS region and the non-MBS region based on the region allocation information; receiving MBS zone allocation information of the at least one MBS zone; allocating the subbands, allocated to the MBS region, to at least one MBS zone based on the MBS zone allocation information; and receiving MBS data through the subbands allocated to the at least one MBS zone, wherein the region allocation information indicates whether each subband is allocated either to the MBS region or to the non-MBS region.

The region allocation information may include a first bitmap including bits corresponding to subbands, and each bit of the first bitmap may indicate whether a corresponding subband is allocated either to the MBS region or to the non-MBS region.

The MBS zone allocation information may include a second bitmap including bits corresponding to remaining subbands other than the first subband among the subbands allocated to the MBS region. Each bit of the second bitmap may indicate whether a corresponding subband is allocated to an MBS region identical with an MBS region of a previous subband.

The MBS transmission carrier may correspond to a mixed carrier for MBS and non-MBS. The method may further include allocating all or some of the subbands, allocated to the non-MBS region, to a MIMO region for MIMO; generating MIMO region allocation information for the MIMO region; transmitting the MIMO region allocation information to an MBS receiving apparatus; and transmitting non-MBS data through subbands allocated to the non-MBS region.

An MBS receiving apparatus according to further yet another embodiment of the present invention includes a control data receiver configured to receive region allocation information of an MBS region and a non-MBS region and MBS zone allocation information of at least one MBS zone; a region allocator configured to allocate subbands of an MBS transmission carrier to the MBS region and the non-MBS region based on the received region allocation information; an MBS zone allocator configured to allocate the subbands, allocated to the MBS zone, to the multiple MBS zones based on the MBS zone allocation information; and an MBS data receiver configured to receive MBS data through the subbands allocated to the at least one MBS zone, wherein the region allocation information indicates whether each subband is allocated either to the MBS region or to the non-MBS region.

The region allocation information may include a first bitmap including bits corresponding to subbands, and each bit of the first bitmap may indicate whether a corresponding subband is allocated either to the MBS region or to the non-MBS region. The MBS zone allocation information may include a second bitmap including bits corresponding to remaining subbands other than the first subband from among the subbands allocated to the MBS region. Each bit of the second bitmap may indicate whether a corresponding subband is allocated to an MBS region identical with an MBS region of a previous subband.

The MBS transmission carrier may correspond to a mixed carrier for MBS and non-MBS. The control data receiver may further receive MIMO region allocation information for multi-input multi-output (MIMO). The MBS receiving apparatus may further include an open-loop region recognizer configured to recognize all or some of the subbands, allocated to the non-MBS region, as a MIMO region based on the received MIMO region allocation information and a non-MBS data receiver configured to receive non-MBS data through the subbands allocated to the non-MBS region.

DETAILED DESCRIPTION OF THE EMBODIMENTS

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the entire specification, in addition, unless explicitly described to the contrary, the word "comprise" and variations such as "comprises" or "comprising", will be understood to imply the inclusion of stated elements but not the exclusion of any other elements.

In this specification, a Mobile Station (MS) may refer to a terminal, a Mobile Terminal (MT), a Subscriber Station (SS), a Portable Subscriber Station (PSS), User Equipment (UE), or an Access Terminal (AT) and may include all or some of the functions of the MT, the SS, the PSS, or the UE.

In this specification, a Base Station (BS) may refer to an Access Point (AP), a Radio Access Station (RAS), a nodeB (Node B), a Base Transceiver Station (BTS), or a Mobile Multihop Relay (MMR)-BS and may include all or some of the functions of the AP, the RAS, the Node B, the BTS, or the MMR-BS.

Furthermore, in this specification, the term 'transmit (or transmission)' covers a concept of unicast, a concept of multicast, and a concept of broadcast. An MBS region includes a region allocated to provide the transmission of MBS service, and a non-MBS region includes a region allocated to provide the transmission of service, such as unicast services, other than MBS service.

Region allocation information, MBS zone allocation information, and MIMO region allocation information for a signal transmitted in a mixed carrier according to an embodiment of the present invention are described below with reference to FIGS. 1 and 2.

Figure 1:
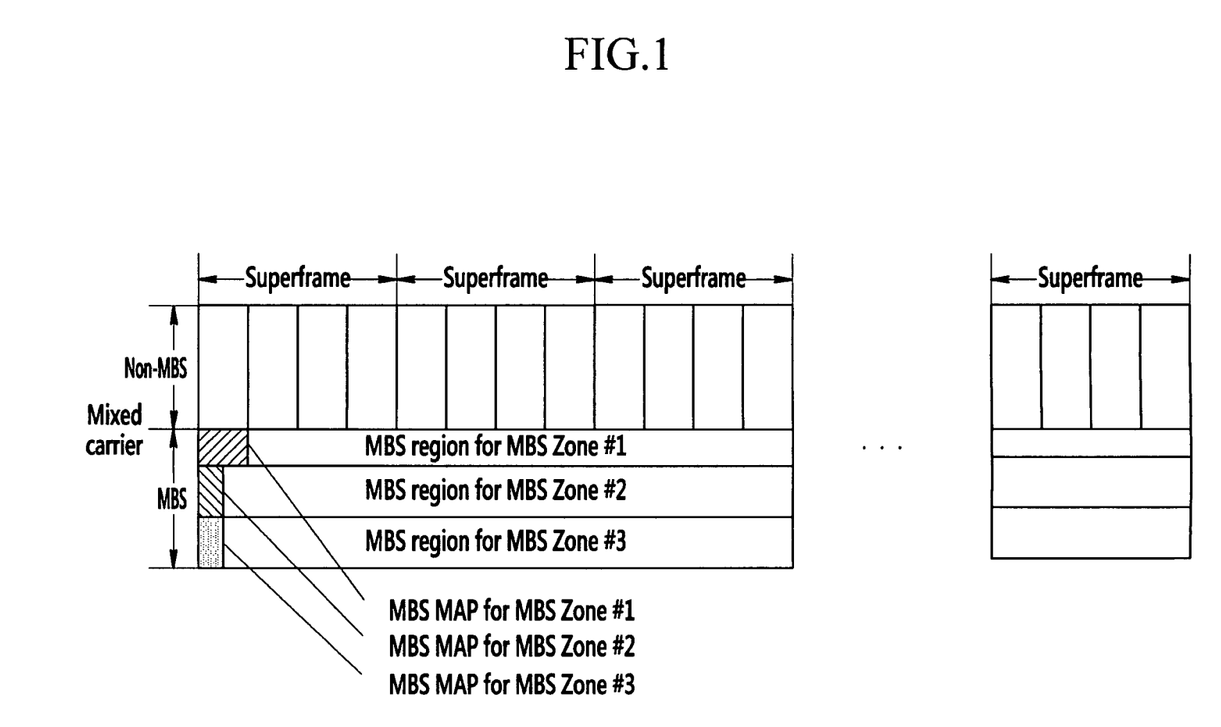
FIG. 1 shows the structure of a mixed carrier according to an embodiment of the present invention.

FIG. 1 shows the structure of a mixed carrier according to an embodiment of the present invention.

The mixed carrier is temporally divided for every superframe. The mixed carrier may be divided into a plurality of subbands on a frequency axis. All of the plurality of subbands may be allocated to an MBS region. Furthermore, the plurality of subbands may be allocated to an MBS region and a non-MBS region. Each region includes at least one subbands.

Meanwhile, the MBS region may be divided into multiple MBS zones on the frequency axis. Each MBS zone includes at least one subbands. In each MBS zone, an MBS map is placed at the front part of an MBS scheduling section including a plurality of superframes.

In the embodiment shown in FIG. 1, the mixed carrier includes three MBS zones and one non-MBS region.

Figure 2:
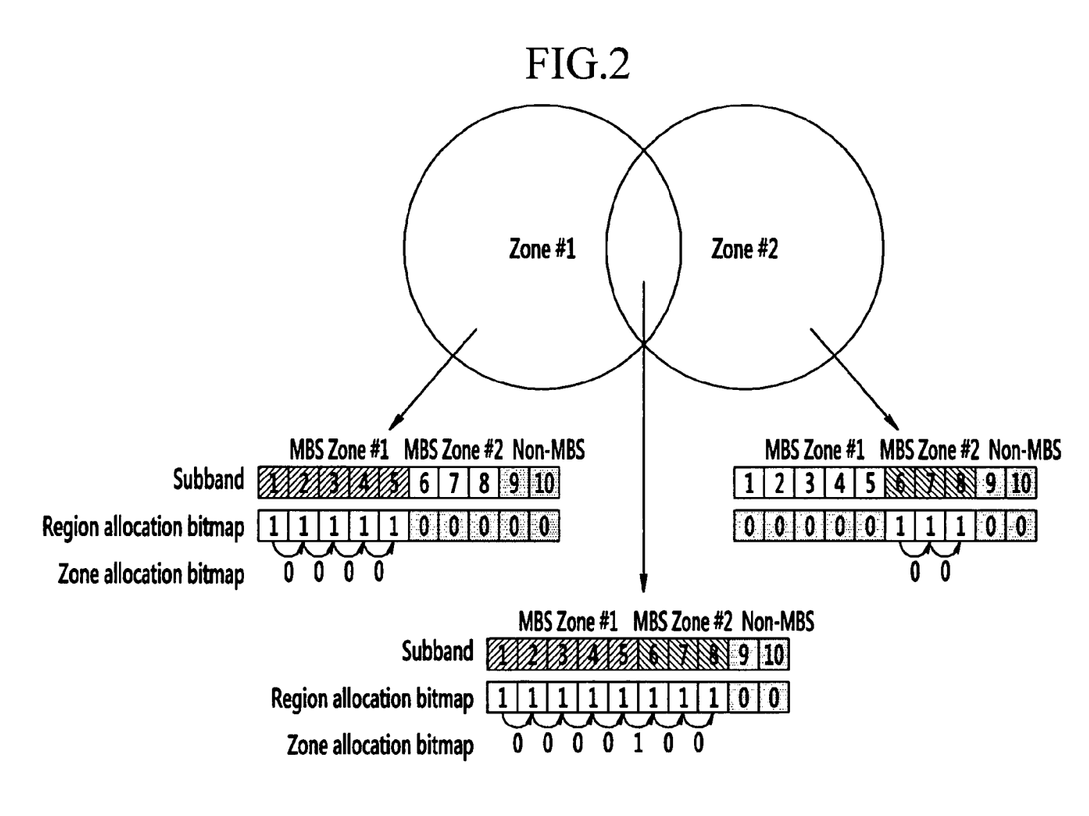
FIG. 2 shows region allocation information and MBS zone allocation information for a signal transmitted in the mixed carrier according to an embodiment of the present invention.

FIG. 2 shows region allocation information and MBS zone allocation information for a signal transmitted in the mixed carrier according to an embodiment of the present invention.

The region allocation information and the MBS zone allocation information according to the embodiment of the present invention is a bitmap including a plurality of bits.

The number of bits of the bitmap for the region allocation information is the same as the number of subbands, and those bits correspond to respective subbands. Each bit of the bitmap for the region allocation information indicates whether a corresponding subband is allocated either to an MBS region or a non-MBS region. In an embodiment of the present invention, a bit set to "1" indicates that a corresponding subband is allocated to the MBS region and a bit set to "0" indicates that a corresponding subband is allocated to the non-MBS region.

The number of bits of the bitmap for the MBS zone allocation information is the same as the number in which 1 has been subtracted from the number of subbands allocated to the MBS region. The bits of the bitmap for the MBS zone allocation information corresponds to the respective remaining subbands other than the first subband of subbands allocated to the MBS region. Each bit of the bitmap for the MBS zone allocation information indicates whether a corresponding subband is allocated to the same MBS region as that allocated by the previous subband. In an embodiment of the present invention, a bit set to "0" indicates whether a corresponding subband is allocated to the same MBS region as that allocated by the previous subband, and a bit set to "1" indicates whether a corresponding subband is allocated to an MBS region different from that allocated by the previous subband. Consequently, the number in which 1 is added to the number of bits set to "1" indicates the number of MBS zones.

As shown in FIG. 2, it is assumed that a network supports an MBS zone #1 and an MBS zone #2, subbands 1 to 5 are allocate to the MBS zone #1, subbands 6 to 8 are allocated to the MBS zone #2, and subbands 9 and 10 are allocated to a non-MBS region.

An MBS transmitting apparatus belonging to both the MBS zone #1 and the MBS zone #2 may allocate the subbands 1 to 8 to the MBS region and the subbands 9 and 10 to the non-MBS region. Accordingly, the MBS transmitting apparatus belonging to both the MBS zone #1 and the MBS zone #2 generates region allocation information including a bitmap corresponding to "1111111100" and transmits the region allocation information to a terminal. Furthermore, the subbands 1 to 5 are allocated to the MBS zone #1, and the subbands 6 to 8 are allocated to the MBS zone #2. Accordingly, the MBS transmitting apparatus belonging to both the MBS zone #1 and the MBS zone #2 generates MBS zone allocation information including a bitmap corresponding to "0000100" and transmits the MBS zone allocation information to a terminal.

Meanwhile, an MBS transmitting apparatus belonging to only the MBS zone #1 may allocate the subbands 1 to 5 to the MBS region and the subbands 6 to 10 to the non-MBS region. Accordingly, the MBS transmitting apparatus belonging to only the MBS zone #1 generates region allocation information including a bitmap corresponding to "1111100000" and transmits the region allocation information to a terminal. Furthermore, since all the subbands 1 to 5 allocated to the MBS region are allocated to the MBS zone #1, the MBS transmitting apparatus belonging to only the MBS zone #1 generates MBS zone allocation information including a bitmap corresponding to "0000" and transmits the MBS zone allocation information to a terminal.

An MBS transmitting apparatus belonging to only the MBS zone #2 may allocate the subbands 6 to 8 to the MBS region and the subbands 1 to 5 and the subbands 9 and 10 to the non-MBS region. Accordingly, the MBS transmitting apparatus belonging to only the MBS zone #2 generates region allocation information including a bitmap corresponding to "0000011100" and transmits the region allocation information to a terminal. Furthermore, since all the subbands 6 to 8 allocated to the MBS region are allocated to the MBS zone #2, the MBS transmitting apparatus belonging to only the MBS zone #2 generates MBS zone allocation information including a bitmap corresponding to "00" and transmits the MBS zone allocation information to a terminal.

An MBS transmitting apparatus may transmit both the region allocation information and the MBS zone allocation information for the mixed carrier according to the embodiment of the present invention through a system information message. The system information message is a message for periodically broadcasting system configuration information that is used for an MBS receiving apparatus to receive the data of a non-MBS region. The system information message may correspond to a system configuration descriptor (SCD) message.

Meanwhile, the MBS zone allocation information for the mixed carrier according to the embodiment of the present invention is information necessary for only an MBS receiving apparatus that receives MBS and may be transmitted by an MBS transmitting apparatus through an MBS-specific message, such as an MBS configuration (MBS-CFG) message. The MBS-CFG message includes MBS configuration information necessary for an MBS receiving apparatus to perform an MBS operation, and it is periodically broadcast by an MBS transmitting apparatus.

A method of transmitting allocation information of the subband unit of a MIMO region for transmitting non-MBS service according to a variety of embodiments of the present invention is described with reference to FIG. 2.

In a first embodiment in which allocation information of the MIMO region is transmitted, an MBS transmitting apparatus may transmit information of the number of subbands, allocated to the MIMO region, as region allocation information. Furthermore, the MBS receiving apparatus recognizes subbands not allocated to an MBS region, from among the number of subbands transmitted from a first subband, as subbands allocated to the MIMO region.

For example, in a system such as that of FIG. 2, an MBS transmitting apparatus may transmit 9 as the number of subbands allocated to the MIMO region. In this case, since an MBS transmitting apparatus belonging to both the MBS zone #1 and the MBS zone #2 allocates the subbands 1 to 8 to the MBS region, an MBS receiving apparatus served by the MBS transmitting apparatus recognizes only the subband 9 as a subband allocated to the MIMO region. Since an MBS transmitting apparatus belonging to only the MBS zone #1 allocates the subbands 1 to 5 to the MBS region, an MBS receiving apparatus served by the MBS transmitting apparatus recognizes the subbands 6 to 9 as subbands allocated to the MIMO region. Since an MBS transmitting apparatus belonging to only the MBS zone #2 allocates the subbands 6 to 8 to the MBS region, an MBS receiving apparatus served by the MBS transmitting apparatus recognizes the subbands 1 to 5 and 9 as subbands allocated to the MIMO region.

In a second embodiment in which allocation information of a MIMO region is transmitted, an MBS transmitting apparatus may transmit the indices of subbands allocated to the MIMO region, from among subbands not allocated to an MBS region. More particularly, the MBS transmitting apparatus may transmit the indices of the subbands, allocated to the MIMO region, through a bitmap. Here, the number of bits of the bitmap is the same as the number of subbands not allocated to the MBS region, and the bits corresponds to respective subbands not allocated to the MBS region. Furthermore, each bit indicates whether a corresponding subband is allocated to a unicast-based MIMO region.

For example, in a system, such as that of FIG. 2, an MBS transmitting apparatus belonging to both the MBS zone #1 and the MBS zone #2 may transmit a bitmap including two bits, an MBS transmitting apparatus belonging to only the MBS zone #1 may transmit a bitmap including 5 bits, and an MBS transmitting apparatus belonging to only the MBS zone #2 may transmit a bitmap including 7 bits.

In a third embodiment in which allocation information of a MIMO region is transmitted, an MBS transmitting apparatus may transmit information of the number of subbands allocated to a MIMO region or a bitmap including the predetermined number of bits, as region allocation information. Here, the number of bits of the bitmap is the same as the number of subbands allocated to the non-MBS region by means of a network in a carrier through which MBS is transmitted. The bits corresponds to respective subbands as many as the number of bits of the bitmap from first subband, from among the number of subbands allocated to the non-MBS region. Furthermore, each bit indicates whether a corresponding subband is allocated to a unicast-based MIMO region.

If an MBS transmitting apparatus transmits information of the number of subbands allocated to the MIMO region, an MBS receiving apparatus recognizes subbands corresponding to the number of subbands transmitted by the MBS transmitting apparatus, from among subbands other than subbands allocated to the MBS region, as subbands allocated to the MIMO region. For example, in a system such as that of FIG. 2, an MBS transmitting apparatus may transmit 2 as the number of subbands allocated to the MIMO region. In this case, since an MBS transmitting apparatus belonging to both the MBS zone #1 and the MBS zone #2 allocates the subbands 9 and 10 to the non-MBS region, an MBS receiving apparatus served by the MBS transmitting apparatus recognizes the subbands 9 and 10 as subbands allocated to the MIMO region. Since an MBS transmitting apparatus belonging to only the MBS zone #1 allocates the subbands 6 to 10 to the non-MBS region, an MBS receiving apparatus served by the MBS transmitting apparatus recognizes the subbands 6 and 7 as subbands allocated to the MIMO region. Since an MBS transmitting apparatus belonging to only the MBS zone #2 allocates the subbands 1 to 5, 9, and 10 to the non-MBS region, an MBS receiving apparatus served by the MBS transmitting apparatus recognizes the subbands 1 and 2 as subbands allocated to the MIMO region.

If an MBS transmitting apparatus transmits a bitmap, the MBS transmitting apparatus transmits a bitmap including two bits because the number of subbands allocated to the non-MBS region by a network in a carrier through which MBS is transmitted includes the subbands 9 and 10. For example, if the MBS transmitting apparatus transmits a bitmap corresponding to "10," an MBS receiving apparatus served by the MBS transmitting apparatus belonging to both the MBS zone #1 and the MBS zone #2 recognizes the subband 9 as a subband allocated to the MIMO region. An MBS receiving apparatus served by an MBS transmitting apparatus belonging to only the MBS zone #1 recognizes the subband 6 as a subband allocated to the MIMO region. An MBS receiving apparatus served by an MBS transmitting apparatus belonging to only the MBS zone #2 recognizes the subband 1 as a subband allocated to the MIMO region.

Region allocation information and MBS zone allocation information of data transmitted in a dedicated carrier according to an embodiment of the present invention is described below with reference to FIGS. 3 and 4.

Figure 3:
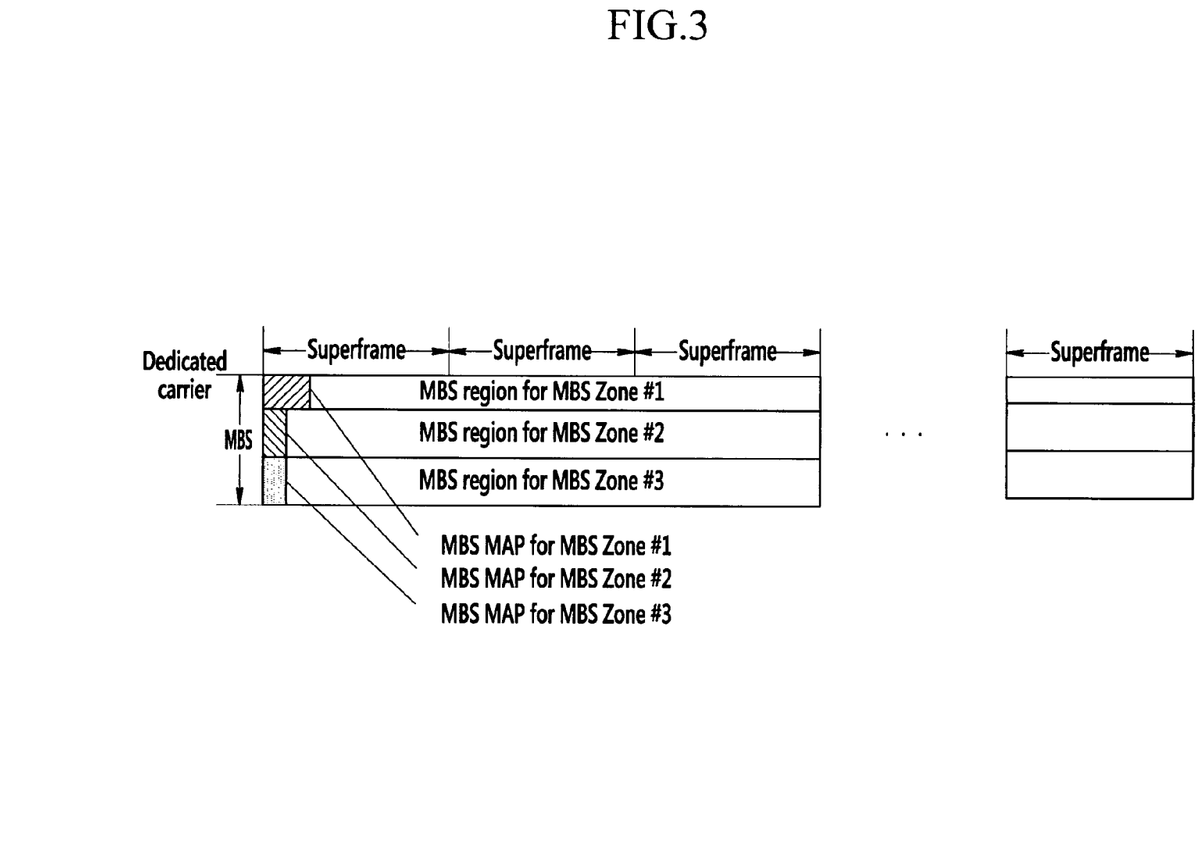
FIG. 3 shows the structure of a dedicated carrier according to an embodiment of the present invention.

FIG. 3 shows the structure of a dedicated carrier according to an embodiment of the present invention.

The dedicated carrier is temporally divided for every superframe. The dedicated carrier may be divided into a plurality of subbands on a frequency axis. All those subbands may be allocated to an MBS region. Furthermore, those subbands may be allocated to an MBS region and an unused region. Each region includes at least one subbands.

Meanwhile, the MBS region may be divided into multiple MBS zones on the frequency axis. Each MBS zone includes at least one subbands. In each MBS zone, an MBS map is transmitted at the beginning of an MBS scheduling interval, including superframes.

In the embodiment shown in FIG. 3, the dedicated carrier includes three MBS zones and one unused region.

Figure 4:
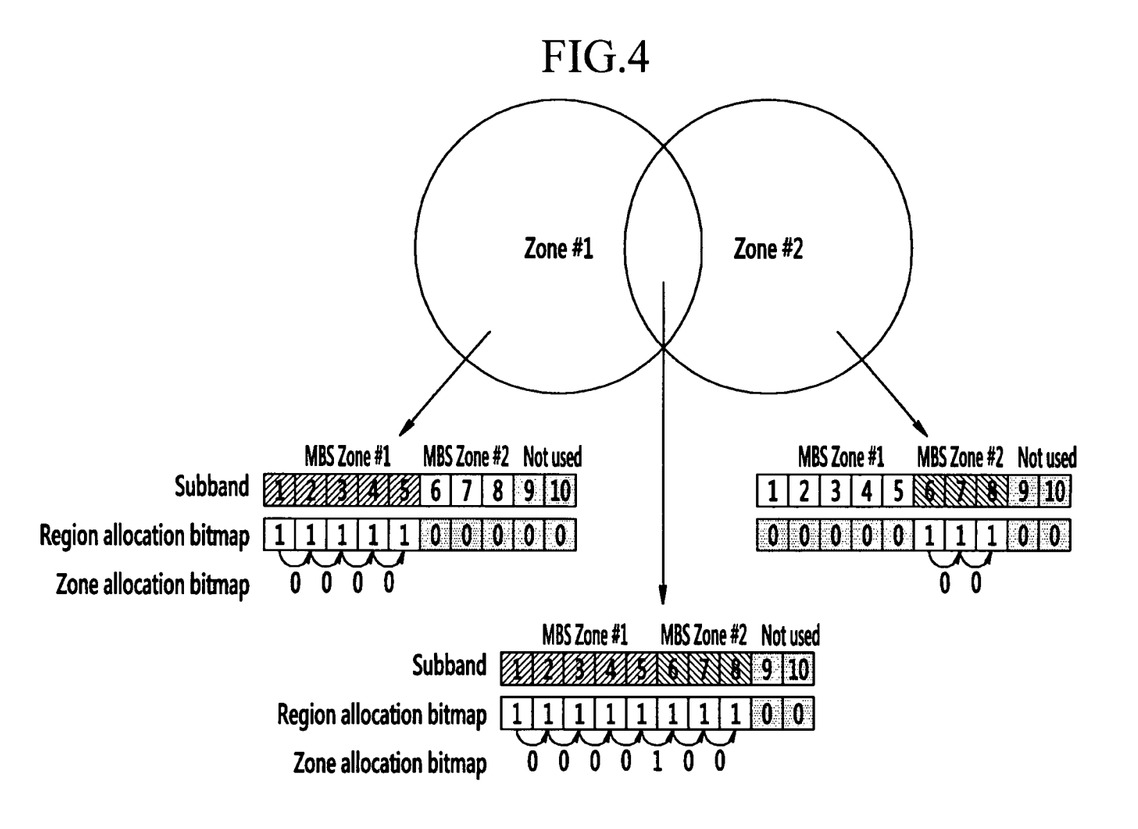
FIG. 4 shows region allocation information and MBS zone allocation information for a signal transmitted in the dedicated carrier according to an embodiment of the present invention.

FIG. 4 shows region allocation information and MBS zone allocation information of data transmitted in the dedicated carrier according to an embodiment of the present invention.

The region allocation information and the MBS zone allocation information according to the embodiment of the present invention is a bitmap including at least one bit.

The number of bits of the bitmap for the region allocation information is the same as the number of subbands, and those bits correspond to respective subbands. Each bit of the bitmap for the region allocation information indicates whether a corresponding subband is allocated to an MBS region or an unused region. In an embodiment of the present invention, a bit set to "1" indicates that a corresponding subband is allocated to the MBS region and a bit set to "0" indicates that a corresponding subband is allocated to the unused region.

The number of bits of the bitmap for the MBS zone allocation information is the same as the number in which 1 has been subtracted from the number of subbands allocated to the MBS region. Those bits of the bitmap for the MBS zone allocation information corresponds to the respective remaining subbands other than the first subband of subbands allocated to the MBS region. Each bit of the bitmap for the MBS zone allocation information indicates whether a corresponding subband is allocated to the same MBS region as that of a previous subband. In an embodiment of the present invention, a bit set to "0" indicates whether a corresponding subband is allocated to the same MBS region as that of a previous subband, and a bit set to "1" indicates whether a corresponding subband is allocated to an MBS region different from that of a previous subband. Consequently, the number in which 1 is added to the number of bits set to "1" indicates the number of MBS zones.

As shown in FIG. 4, it is assumed that a network supports an MBS zone #1 and an MBS zone #2, subbands 1 to 5 are allocate to the MBS zone #1, subbands 6 to 8 are allocated to the MBS zone #2, and subbands 9 and 10 are allocated to an unused region.

An MBS transmitting apparatus belonging to both the MBS zone #1 and the MBS zone #2 may allocate the subbands 1 to 8 to the MBS region and the subbands 9 and 10 to the unused region. Accordingly, the MBS transmitting apparatus belonging to both the MBS zone #1 and the MBS zone #2 generates region allocation information including a bitmap corresponding to "1111111100" and transmits the region allocation information to a terminal. Furthermore, the subbands 1 to 5 are allocated to the MBS zone #1, and the subbands 6 to 8 are allocated to the MBS zone #2. Accordingly, the MBS transmitting apparatus belonging to both the MBS zone #1 and the MBS zone #2 generates MBS zone allocation information including a bitmap corresponding to "0000100" and transmits the MBS zone allocation information to a terminal.

Meanwhile, an MBS transmitting apparatus belonging to only the MBS zone #1 may allocate the subbands 1 to 5 to the MBS region and the subbands 6 to 10 to the unused region. Accordingly, the MBS transmitting apparatus belonging to only the MBS zone #1 generates region allocation information including a bitmap corresponding to "1111100000" and transmits the region allocation information to a terminal. Furthermore, since all the subbands 1 to 5 allocated to the MBS region are allocated to the MBS zone #1, the MBS transmitting apparatus belonging to only the MBS zone #1 generates MBS zone allocation information including a bitmap corresponding to "0000" and transmits the MBS zone allocation information to a terminal.

An MBS transmitting apparatus belonging to only the MBS zone #2 may allocate the subbands 6 to 8 to the MBS region and the subbands 1 to 5 and the subbands 9 and 10 to the unused region. Accordingly, the MBS transmitting apparatus belonging to only the MBS zone #2 generates region allocation information including a bitmap corresponding to "0000011100" and transmits the region allocation information to a terminal. Furthermore, since all the subbands 6 to 8 allocated to the MBS region are allocated to the MBS zone #2, the MBS transmitting apparatus belonging to only the MBS zone #2 generates MBS zone allocation information including a bitmap corresponding to "00" and transmits the MBS zone allocation information to a terminal.

An MBS transmitting apparatus may transmit both the region allocation information and the MBS zone allocation information for the dedicated carrier according to the embodiment of the present invention through a system information message. Furthermore, the region allocation information may be transmitted through the system information message, and the MBS zone allocation information may be transmitted through an MBS-specific message.

Furthermore, an MBS transmitting apparatus may transmit both the region allocation information and the MBS zone allocation information for the dedicated carrier according to the embodiment of the present invention through an MBS-specific message. In this case, there is an advantage in that an MBS receiving apparatus receiving only MBS does not need to receive the system information message.

An MBS transmitting apparatus according to an embodiment of the present invention is described with reference to FIG. 5.

Figure 5:
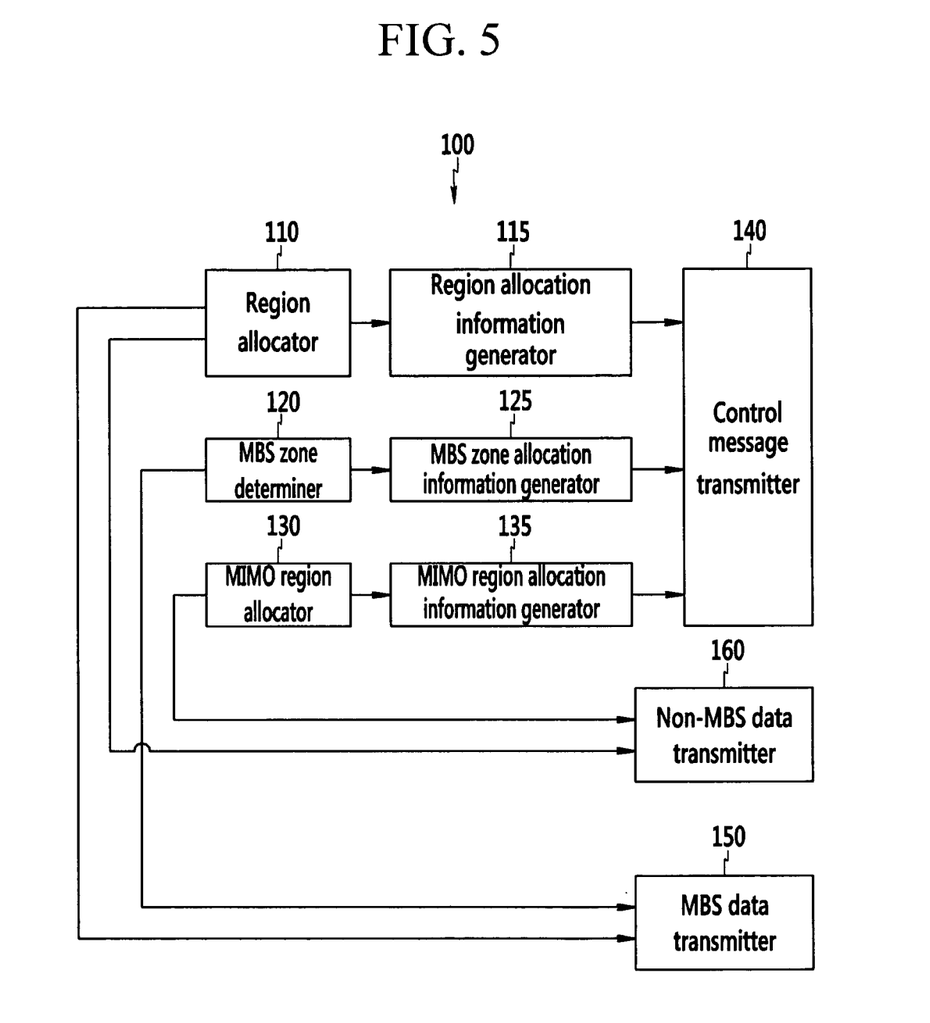
FIG. 5 is a block diagram showing the construction of an MBS transmitting apparatus according to an embodiment of the present invention.

FIG. 5 is a block diagram showing the construction of the MBS transmitting apparatus according to the embodiment of the present invention.

As shown in FIG. 5, the MBS transmitting apparatus 100 includes a region allocator 110, a region allocation information generator 115, an MBS zone determiner 120, an MBS zone allocation information generator 125, a MIMO region allocator 130, a MIMO region allocation information generator 135, a control message transmitter 140, an MBS data transmitter 150, and a non-MBS data transmitter 160. The operations of the constituent elements of the MBS transmitting apparatus 100 according to the embodiment of the present invention are described below with reference to FIG. 6.

Figure 6:
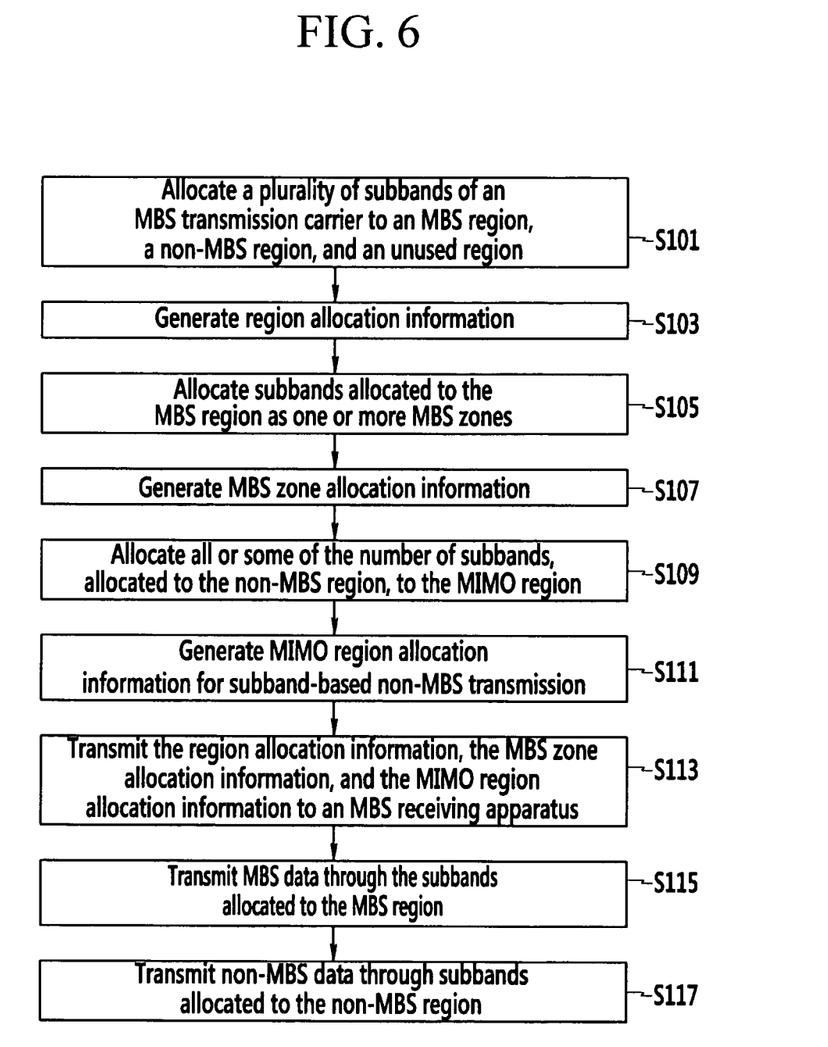
FIG. 6 is a flowchart illustrating the operation of the MBS transmitting apparatus according to an embodiment of the present invention.

FIG. 6 is a flowchart illustrating the operation of the MBS transmitting apparatus according to an embodiment of the present invention.

The region allocator 110 allocates subbands of an MBS transmission carrier to an MBS region, a non-MBS region, and an unused region at step S101. If the MBS transmission carrier corresponds to a mixed carrier as described above, the region allocator 110 may allocate all possible subbands to the MBS region or allocate those subbands to the MBS region and the non-MBS region. If the MBS transmission carrier corresponds to a dedicated carrier, the region allocator 110 may allocate all possible subbands to the MBS region or allocate those subbands to the MBS region and the unused region.

The region allocation information generator 115 generates region allocation information, such as that described with reference to FIG. 2 or FIG. 4 at step S103.

The MBS zone determiner 120 allocates subbands allocated to the MBS region as at least one MBS zone at step S105.

The MBS zone allocation information generator 125 generates MBS zone allocation information, such as that described with reference to FIG. 2 or FIG. 4 at step S107.

The MIMO region allocator 130 allocates all or some of the number of subbands, allocated to the non-MBS region, to the MIMO region at step S109. If the MBS transmission carrier corresponds to a dedicated carrier, the MIMO region allocator 130 does not need to allocate the MIMO region.

The MIMO region allocation information generator 135 generates MIMO region allocation information for subband-based non-MBS transmission, such as that described with reference to FIG. 2 at step S111. If the MBS transmission carrier corresponds to a dedicated carrier, the MIMO region allocation information generator 135 does not need to generate the MIMO region allocation information.

The control message transmitter 140 transmits the region allocation information, the MBS zone allocation information, and the MIMO region allocation information to an MBS receiving apparatus at step S113. The region allocation information, the MBS zone allocation information, and the MIMO region allocation information may be transmitted through different control messages or may be transmitted through one control message. If the MBS transmission carrier corresponds to a mixed carrier, both the region allocation information and the MBS zone allocation information may be transmitted through a system information message. If the MBS transmission carrier corresponds to a dedicated carrier, the region allocation information may be transmitted through a system information message or may be transmitted through an MBS-specific message.

The MBS data transmitter 150 multicasts or broadcasts MBS data through the subbands allocated to the MBS region at step S115. More particularly, the MBS data transmitter 150 transmits MBS data for each MBS zone through subbands allocated to a corresponding MBS zone.

The non-MBS data transmitter 160 transmits non-MBS data through subbands allocated to the non-MBS region at step S117. More particularly, the non-MBS data transmitter 160 transmits non-MBS data through subbands allocated to the MIMO region of the non-MBS region in a MIMO mode.

An MBS receiving apparatus according to an embodiment of the present invention is described below with reference to FIG. 7.

Figure 7:
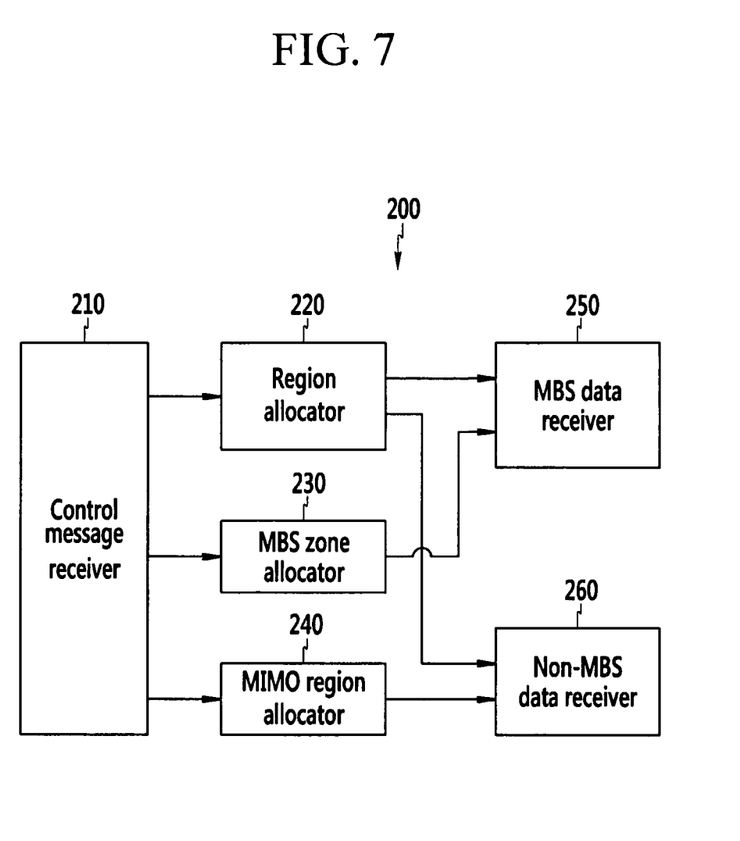
FIG. 7 is a block diagram showing the construction of an MBS receiving apparatus according to an embodiment of the present invention.

FIG. 7 is a block diagram showing the construction of an MBS receiving apparatus according to an embodiment of the present invention.

As shown in FIG. 7, the MBS receiving apparatus 200 includes a control message receiver 210, a region allocator 220, an MBS zone allocator 230, a MIMO region allocator 240, an MBS data receiver 250, and a non-MBS data receiver 260.

The operations of the constituent elements of the MBS receiving apparatus 200 according to the embodiment of the present invention are described with reference to FIG. 8.

Figure 8:
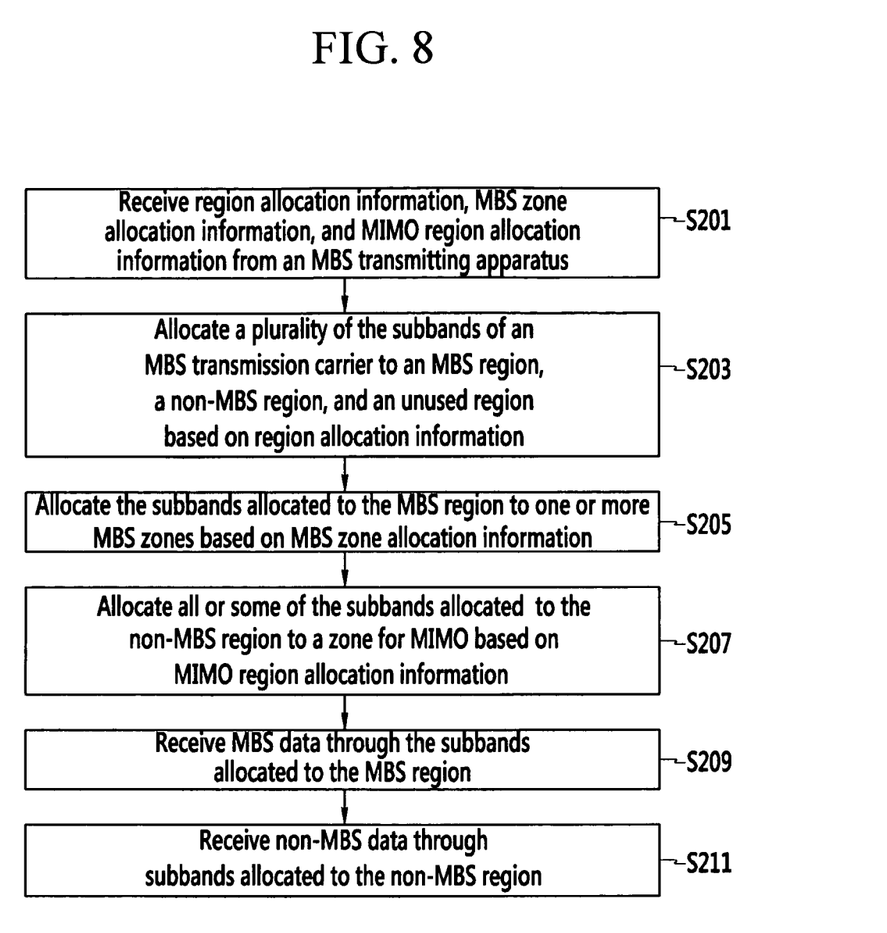
FIG. 8 is a flowchart illustrating the operation of the MBS receiving apparatus according to an embodiment of the present invention.

FIG. 8 is a flowchart illustrating the operation of the MBS receiving apparatus according to an embodiment of the present invention.

The control message receiver 210 receives region allocation information, MBS zone allocation information, and MIMO region allocation information from an MBS transmitting apparatus at step S201.

The region allocator 220 allocates subbands of an MBS transmission carrier to an MBS region, a non-MBS region, and an unused region based on region allocation information received as described above with reference to FIG. 2 or FIG. 4 at step S203. If the MBS transmission carrier corresponds to a mixed carrier, the region allocator 220 may recognize all subbands as the MBS region or may allocate those subbands to the MBS region and the non-MBS region. If the MBS transmission carrier corresponds to a dedicated carrier, the region allocator 220 may recognize all subbands as the MBS region or may allocate those subbands to the MBS region and the unused region.

The MBS zone allocator 230 allocates the subbands allocated to the MBS region to at least one MBS zone based on MBS zone allocation information received as described above with reference to FIG. 2 or FIG. 4 at step S205.

The MIMO region allocator 240 allocates all or some of the subbands allocated to the non-MBS region to a zone for MIMO based on MIMO region allocation information received as described above with reference to FIG. 2 or FIG. 4 at step S207. If the MBS transmission carrier corresponds to a dedicated carrier, the MIMO region recognizer 240 does not need to allocate a MIMO region for subband-based non-MBS transmission.

The MBS data receiver 250 receives MBS data through the subbands allocated to the MBS region at step S209. More particularly, the MBS data receiver 250 receives MBS data for each MBS zone through subbands allocated to a corresponding MBS zone.

The non-MBS data receiver 260 receives non-MBS data through subbands allocated to the non-MBS region at step S211. More particularly, the non-MBS data receiver 260 receives non-MBS data through subbands allocated to the MIMO region of the non-MBS region in a MIMO mode.

As described above, the MBS transmitting apparatus transmits region allocation information, indicating whether each subband is allocated to an MBS region or allocated to a non-MBS region. Accordingly, waste of the bandwidth can be prevented because subbands corresponding to an unsupported MBS zone can be allocated to a non-MBS region.

Furthermore, an MBS transmitting apparatus can transmit clear information of a less amount of bits to an MBS receiving apparatus by transmitting a bitmap as region allocation information and MBS zone allocation information.

Furthermore, an MBS transmitting apparatus can clearly transfer information of a MIMO region for subband-based non-MBS transmission to an MBS receiving apparatus.

According to an embodiment of the present invention, an MBS transmitting apparatus may become a base station or a relay station, and an MBS receiving apparatus may become an MBS receiving apparatus.

The above embodiments of the present invention are not implemented by only a method and an apparatus, but may be implemented using a program for realizing a function corresponding to the construction of the embodiment of the present invention or a recording medium on which the program is recorded. The implementation can be easily achieved by those having ordinary skill in the art to which the present invention pertains from the above embodiment.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A method of transmitting multicast broadcast service (MBS) data in an MBS transmitting apparatus, the method comprising:
    allocating subbands of an MBS transmission carrier to an MBS region and a non-MBS region;
    generating region allocation information of the MBS region and the non-MBS region;
    allocating subbands, allocated to the MBS region, to at least one MBS zone;
    generating MBS zone allocation information of the at least one MBS zone;
    transmitting the region allocation information and the MBS zone allocation information;
    transmitting the MBS data through the subbands allocated to the MBS region;
    generating multi-input multi-output (MIMO) region allocation information for the MIMO region; and
    transmitting the MIMO region allocation information to an MBS receiving apparatus,
    wherein the region allocation information indicates whether each subband is allocated to the MBS region or allocated to the non-MBS region, the region allocation information is broadcast through a system information message,
    the MBS zone allocation information is broadcast through an MBS-specific message,
    the MIMO region allocation information is broadcast through the system information message,
    the MBS transmission carrier corresponds to an MBS dedicated carrier,
    the non-MBS region corresponds to an unused region,
    the dedicated carrier is temporally divided for every superframe,
    the dedicated carrier is divided into a plurality of subbands on a frequency axis,
    the MBS region is divided into multiple MBS zones on the frequency axis, and
    an MBS map is transmitted at the beginning of an MBS scheduling interval.

2. The method of claim 1, wherein the region allocation information comprises a first bitmap including bits corresponding to the subbands, and
    each bit of the first bitmap indicates whether a corresponding subband is allocated either to the MBS region or to the non-MBS region.

3. The method of claim 2, wherein the MBS zone allocation information comprises a second bitmap including bits corresponding to remaining subbands not a first subband among the subbands allocated to the MBS region, and
    each bit of the second bitmap indicates whether a corresponding subband is allocated to a same MBS region as that allocated by a previous subband.

4. The method of claim 3, wherein the MBS transmission carrier corresponds to a mixed carrier for MBS and non-MBS, and
    the method comprising transmitting non-MBS data through subbands allocated to the non-MBS region.

5. The method of claim 1, further comprising:
    allocating all or some of the subbands, allocated to the non-MBS region, to the multi-input multi-output (MIMO) region.

6. The method of claim 5, wherein the MIMO region allocation information comprises information of the number of the subbands allocated to the MIMO region, and
    subbands not allocated to the MBS region, among subbands corresponding to the number from the first subband, correspond to the MIMO region.

7. The method of claim 5, wherein the MIMO region allocation information comprises a third bitmap including bits corresponding to the subbands allocated to the non-MBS region, and
    each bit of the third bitmap indicates whether a corresponding subband is allocated to the MIMO region.

8. The method of claim 5, wherein the MIMO region allocation information comprises information of the number of the subbands allocated to the MIMO region, and subbands corresponding to the number from a first subband, among the subbands allocated to the non-MBS region, correspond to the MIMO region.

9. The method of claim 5, wherein the MIMO region allocation information comprises a third bitmap including a plurality of bits, the plurality of bits of the third bitmap corresponds to subbands corresponding to the number of bits of the third bitmap from the first subband, among the subbands that are allocated to the MBS region by a network, and each bit of the third bitmap indicates whether a corresponding subband is allocated to the MIMO region.

10. An MBS transmitting apparatus, the apparatus comprising:

a region allocator configured to allocate a plurality of subbands of an MBS transmission carrier to an MBS region and a non-MBS region;

a region allocation information generator configured to generate region allocation information of the MBS region and the non-MBS region;

an MBS zone allocator configured to allocate the subbands, allocated to the MBS region to at least one MBS zone;

an MBS zone allocation information generator configured to generate MBS zone allocation information of the at least one MBS zone;

a control data transmitter configured to transmit the region allocation information and the MBS zone allocation information;

an MBS data transmitter configured to transmit MBS data through the subbands allocated to the MBS region;

a multi-input multi-output (MIMO) region allocation information generator configured to generate MIMO region allocation information for the MIMO region, wherein the control data transmitter transmits the MIMO region allocation information to an MBS receiving apparatus, the region allocation information indicates whether each subband is allocated either to the MBS region or to the non-MBS region, the region allocation information is broadcast through a system information message, the MBS zone allocation information is broadcast through an MBS-specific message, and the MIMO region allocation information is broadcast through the system information message, the MBS transmission carrier corresponds to an MBS dedicated carrier, the non-MBS region corresponds to an unused region, the dedicated carrier is temporally divided for every superframe, the dedicated carrier is divided into a plurality of subbands on a frequency axis, the MBS region is divided into multiple MBS zones on the frequency axis, and an MBS map is transmitted at the beginning of an MBS scheduling interval.

11. The apparatus of claim 10, wherein the region allocation information comprises a first bitmap including bits corresponding to the subbands, each bit of the first bitmap indicates whether a corresponding subband is allocated either to the MBS region or to the non-MBS region, the MBS zone allocation information comprises a second bitmap including bits corresponding to remaining subbands not a first subband from among the subbands allocated to the MBS region, and each bit of the second bitmap indicates whether a corresponding subband is allocated to the same MBS region as that allocated by a previous subband.

12. The apparatus of claim 11, wherein the MBS transmission carrier corresponds to a mixed carrier for MBS and non-MBS, and the apparatus further comprises:

a non-MBS data transmitter configured to transmit non-MBS data through subbands allocated to the non-MBS region;

a MIMO region allocator configured to allocate all or some of the subbands, allocated to the non-MBS region, to a MIMO region for MIMO; and a MIMO region allocation information generator configured to generate MIMO region allocation information for the MIMO region, wherein the control data transmitter transmits the MIMO region allocation information to an MBS receiving apparatus.

13. A method of receiving MBS data in an MBS receiving apparatus, the method comprising:

receiving region allocation information of an MBS region and a non-MBS region;

allocating subbands of an MBS transmission carrier to the MBS region and the non-MBS region based on the region allocation information;

receiving MBS zone allocation information of the at least one MBS zone;

allocating the subbands, allocated to the MBS region, to at least one MBS zone based on the MBS zone allocation information;

receiving MBS data through the subbands allocated to the at least one MBS zone; and receiving multi-input multi-output (MIMO) region allocation information from an MBS transmitting apparatus, wherein the region allocation information indicates whether each subband is allocated either to the MBS region or to the non-MBS region, the region allocation information is broadcast through a system information message, the MBS zone allocation information is broadcast through an MBS-specific message, and the MIMO region allocation information is broadcast through the system information message, the MBS transmission carrier corresponds to an MBS dedicated carrier, the non-MBS region corresponds to an unused region, the dedicated carrier is temporally divided for every superframe, the dedicated carrier is divided into a plurality of subbands on a frequency axis, the MBS region is divided into multiple MBS zones on the frequency axis, and an MBS map is transmitted at the beginning of an MBS scheduling interval.

14. The method of claim 13, wherein the region allocation information comprises a first bitmap including bits corresponding to the subbands, and each bit of the first bitmap indicates whether a corresponding subband is allocated either to the MBS region or to the non-MBS region.

15. The method of claim 14, wherein the MBS zone allocation information comprises a second bitmap including bits corresponding to remaining subbands not a first subband among the subbands allocated to the MBS region, and each bit of the second bitmap indicates whether a corresponding subband is allocated to a same MBS region as that allocated by a previous subband.

16. The method of claim 15, wherein the MBS transmission carrier corresponds to a mixed carrier for MBS and non-MBS, and
wherein the method comprising:
allocating all or some of the subbands, allocated to the non-MBS region, to a MIMO region for MIMO;
generating MIMO region allocation information of the MIMO region;
transmitting the MIMO region allocation information to an MBS receiving apparatus; and
transmitting non-MBS data through subbands allocated to the non-MBS region.

17. An MBS receiving apparatus, the apparatus comprising:
a control data receiver configured to receive region allocation information of an MBS region and a non-MBS region and MBS zone allocation information of at least one MBS zone;
a region allocator configured to allocate subbands of an MBS transmission carrier to the MBS region and the non-MBS region based on the region allocation information;
an MBS zone allocator configured to allocate the subbands, allocated to the MBS zone, to the at least one MBS zone based on the MBS zone allocation information;
an MBS data receiver configured to receive MBS data through the subbands allocated to the at least one MBS zone;
a multi-input multi-output (MIMO) region allocator configured to allocate MIMO region for MIMO based on a MIMO region allocation information,
wherein the region allocation information indicates whether each subband is allocated to the MBS region or to the non-MBS region, the region allocation information is broadcast through a system information message,
the MBS zone allocation information is broadcast through an MBS-specific message, and
the MIMO region allocation information is broadcast through the system information message,
the MBS transmission carrier corresponds to an MBS dedicated carrier,
the non-MBS region corresponds to an unused region,
the dedicated carrier is temporally divided for every superframe,
the dedicated carrier is divided into a plurality of subbands on a frequency axis,
the MBS region is divided into multiple MBS zones on the frequency axis, and
an MBS map is transmitted at the beginning of an MBS scheduling interval.

18. The apparatus of claim 17, wherein the region allocation information comprises a first bitmap including bits corresponding to the subbands,
each bit of the first bitmap indicates whether a corresponding subband is allocated either to the MBS region or to the non-MBS region,
the MBS zone allocation information comprises a second bitmap including a plurality of bits corresponding to remaining subbands not a first subband from among the subbands allocated to the MBS region, and
each bit of the second bitmap indicates whether a corresponding subband is allocated to a same MBS region as that allocated by the previous subband.

19. The apparatus of claim 18, wherein the MBS transmission carrier corresponds to a mixed carrier for MBS and non-MBS, and
the control data receiver further receives MIMO region allocation information for MIMO, and
wherein the apparatus further comprises:
an open-loop region recognizer configured to recognize all or some of the subbands,
allocated to the non-MBS region, as a MIMO region based on the MIMO region allocation information; and
a non-MBS data receiver configured to receive non-MBS data through the subbands allocated to the non-MBS region.

* * * * *